Jan. 1, 1952  H. L. GARNIER  2,580,669
CONTINUOUS CHANGE-SPEED GEAR
Filed Oct. 29, 1949  2 SHEETS—SHEET 1

Inventor
Henri Louis Garnier
By Robert E. Burns
Attorney

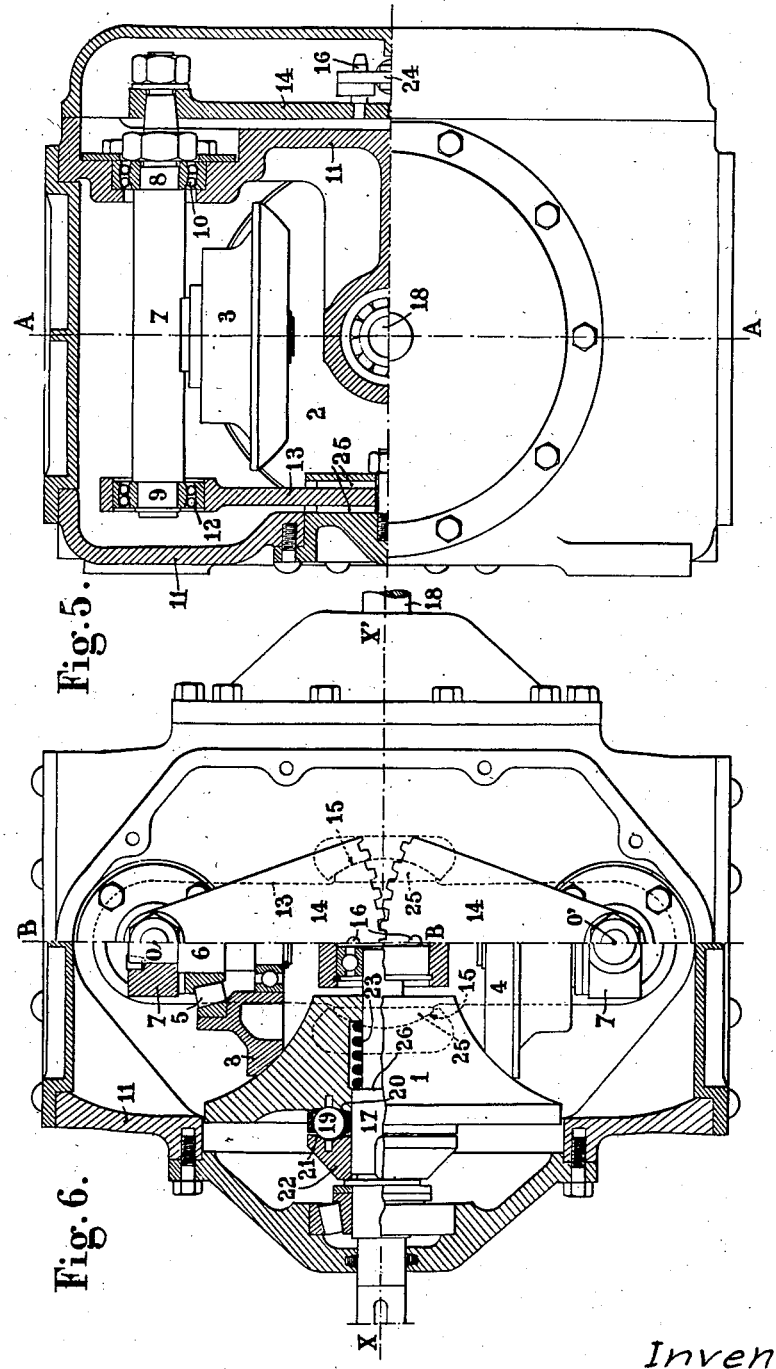

Patented Jan. 1, 1952

2,580,669

UNITED STATES PATENT OFFICE 2,580,669

CONTINUOUS CHANGE-SPEED GEAR

Henri Louis Garnier, Courbevoie, France

Application October 29, 1949, Serial No. 124,364
In France May 23, 1949

2 Claims. (Cl. 74—200)

The present invention has for its object a continuous friction change-speed gear of the kind in which the motion is transmitted from a drum the generatrix of which is an arc of a circle to a coaxial companion drum the generatrix of which is an arc of a circle having the same radius and the same centre as the former through the medium of a pair of idle rollers a generatrix of which is also an arc of a circle having the same radius and the same centre as the preceding ones and the axes of which remain permanently in one plane through the axis common to the pair of drums and can be set at various although always equal angles to the said axis. This change-speed gear departs from the ones already known by improvements the main purpose of which is to ensure a perfect balance between the thrusts on the friction rollers and consequently a constant power transmission even where the finish of the gear parts is not quite satisfactory, e. g. where the drums and the friction rollers are not quite accurately centered or where interaxial distances are not absolutely equal, which practically is always the case.

The said improvements are concerned more particularly with the means to vary the inclination of the axes of the friction rollers with respect to the axis of the driving and the driven drums, with the coupling of said drums with their respective shafts and with a slightly deformable mounting of the swingable pivots of the rollers.

The said improvements will be described hereinafter, reference being had to the appended drawing in which Figs. 1 to 4 are merely explanatory diagrammatical views while in Figs. 5 and 6 an embodiment of the change-speed gear according to this invention is shown by way of example.

Figure 3:
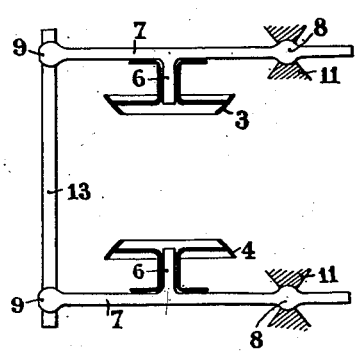

Figure 3 diagrammatically shows the joints of the two roller-carrying arms.

Figure 4:
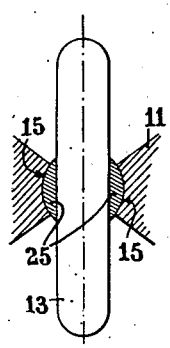

Figure 4 is a diagrammatic sectional view taken on line IV—IV in Fig. 3 and shows the members on which is mounted the cross bar that interconnects the two arms.

Figure 5 is a composite elevational and sectional view taken on line B—B in Fig. 6.

Figure 6 is partly an elevational view of the apparatus with its casing open and partly a sectional view taken on line A—A in Fig. 5.

Figure 1:
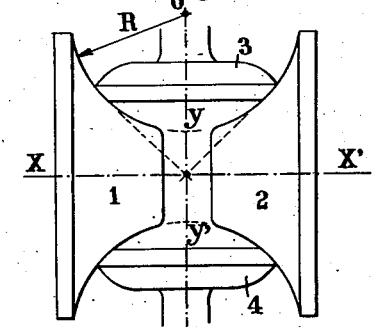
Figure 1 is a diagrammatical view of the drums and transmission rollers of the gear.
Figure 2:
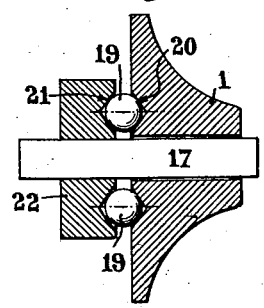
Figure 2 is a diagrammatical view showing the mounting of the drums on their shafts.

According to a known arrangement the apparatus essentially comprises a pair of drums 1, 2 having a common axis $x-x'$ (see Fig. 1) and of which the generatrices are arcs of circles having their centres at $o$ and $o'$ and equal radii R. The one of them is the driving drum and the other the driven drum. Power is transmitted from the former to the latter through a pair of rollers 3, 4 arranged symmetrically with respect to the axis $x-x'$, their axes of rotation $o-y$ and $o'-y'$ being maintained in the plane $x-x'-y-y'$ and being equally inclined with respect to the plane $o-o'$ at right angles to $x-x'$; the generatrices of the said rollers are likewise arcs of circles having the same centres and radii as those of the drums 1 and 2.

To each particular inclination of the axis of the rollers there corresponds a definite ratio between the speeds of drums 1 and 2, and said ratio may be varied continuously between two reciprocal limit values $k$ and $1/k$.

The particular arrangements providing the subject-matter of this invention are as follows:

Each roller 3, 4 is mounted through the medium of a ball- or a roller-bearing 5 on a pivot 6 rigid with an arm 7 at right angles to the plane $x-x'-y-y'$; said arm is formed at its ends with trunnions of which the one 8 is mounted in a ball 10 socketed in a bearing rigid with the casing 11 of the apparatus while the other trunnion 9 is mounted in a ball 12 socketed in a bearing rigid with a cross bar 13 capable of slight displacements. With this end in view said bar is slidably and swingably mounted in a pair of segmental bearings 25 received in housings 15 in the casing 11 in such a manner that they can oscillate slightly about an axis at right angles to the plane $x-x'-o-o'$. With the cross bar 13 thus free to slide and to oscillate the two arms 7 are enabled to oscillate slightly with respect to the casing while remaining substantially parallel with each other, which means that the rollers 3, 4 can remain permanently in contact with the drums 1 and 2, whereby a constant pressure is ensured irrespective of inaccuracies in the centering of the said members on their pivots.

The symmetrical angular displacement of the roller pivots 6 is obtained by means of a pair of toother sectors 14 keyed on trunnions 8 and meshing with each other; the said sectors can be moved with the aid of a suitable mechanism, e. g. by means of a slide 24 in which pins 16 rigid with said sectors are engaged and which is guided in the direction $x-x'$. In the embodiment shown the drums 1, 2 are mounted with a play for free rotation on their respective shafts 17, 18; they are coupled with the same through the medium of a number of balls 19 received in as many conical recesses 20, 21 provided on the one hand in the outer end faces of said drums and on the other hand in the inner end faces of members 22 keyed respectively on the shafts 17 and 18.

23 designates a coil spring which is rested against a shoulder 26 on said shafts and by which the related drum 1 or 2 is urged inwards to provide for the necessary frictional contact between the drums and the rollers. These parts of the gear may be made of hardened steel and work in an oil bath, or of any suitable friction material adapted to work dry or in a lubricant.

A change-speed gear designed as described combines advantages which are important in several respects: the slip between the rollers and the drums is suppressed altogether, whereby a serious cause of wear and heating is removed and the efficiency of the mechanism is increased. Besides, the provision of balls 19 housed in conical recesses 20, 21 makes it possible at all times to proportionate the normal adhesion effect to the tangential effect required, which makes it unnecessary to overload the drum and the roller thrust bearings; the mechanical efficiency of the mechanism can thus be brought to a maximum.

Last, said efficiency is removed from the effects of unsatisfactory workmanship since the normal stresses at the boundaries between the rollers and the drums will remain constant throughout their revolution in spite of possible inaccuracies in the centering of these parts.

It is to be understood that the invention is not limited to the embodiment described and shown and that modifications may be made in the various details set forth without thereby departing from its scope.

What I claim is:

1. A continuous speed changing mechanism comprising a casing, a driving member rotatably mounted on said casing and a driven member rotatably mounted on said casing coaxial with said driving member, said driving and driven members having a concave circular outline adapted for their frictional engagement with shiftable intermediate rollers, a pair of ball-and-socket joints on said casing, on a same line orthogonal to the common axis of said driving and driven members, a pair of support members articulated on said casing through said ball-and-socket joints, a coupling member slidably and pivotally mounted at its middle part on said casing, around a pivoting axis perpendicular to the common axis of the driving and driven members, ball-and-socket joints connecting the ends of said coupling member with respective support members, said intermediate rollers mounted on said respective support members, freely rotatable around an axis perpendicular to the line of the ball-and-socket joints of the considered support-member, said rollers being adapted for frictional engagement with both aforesaid driving and driven members, and means for shifting said support members by equal and symmetrical angles around the lines of their ball-and-socket joints.

2. A continuous speed changing mechanism comprising a casing, a driving and a driven member rotatably and coaxially mounted on said casing, said driving and driven members having a concave circular outline adapted for their frictional engagement with shiftable intermediate rollers and being slidably mounted with regard to each other along their common axis, resilient return means for said members in their slidable relative displacement, a pair of ball-and-socket joints on said casing, on a same line orthogonal to the common axis of said driving and driven members, a pair of support members articulated on said casing through said ball-and-socket joints, a coupling member slidably and pivotally mounted at its middle part on said casing, around a pivoting axis perpendicular to the common axis of the driving and driven members, ball-and-socket joints connecting the ends of said coupling member with respective support members, said intermediate rollers mounted on said respective support members, freely rotatable around an axis perpendicular to the line of the ball-and-socket joints of the considered support-member, said rollers being adapted for frictional engagement with both aforesaid driving and driven members, and means for shifting said support members by equal and symmetrical angles around the lines of their ball-and-socket joints.

HENRI LOUIS GARNIER.

REFERENCES CITED

The following references are of record in the file of this patent:

UNITED STATES PATENTS

| Number | Name | Date |
| --- | --- | --- |
| 457,100 | Yates | Aug. 4, 1891 |
| 751,958 | Spencer | Feb. 9, 1904 |

FOREIGN PATENTS

| Number | Country | Date |
| --- | --- | --- |
| 75,605 | Sweden | Dec. 19, 1928 |
| 88,903 | Sweden | Mar. 31, 1937 |
| 236,081 | Switzerland | May 16, 1945 |
| 405,809 | Germany | Apr. 7, 1920 |
| 476,589 | Great Britain | Dec. 13, 1937 |